United States Patent [19]
Gove et al.

[11] Patent Number: 5,990,982
[45] Date of Patent: Nov. 23, 1999

[54] DMD-BASED PROJECTOR FOR INSTITUTIONAL USE

[75] Inventors: Robert Gove, Los Gatos, Calif.; Adam J. Kunzman, Carrollton, Tex.

[73] Assignee: Texas Instruments Incorporated, Dallas, Tex.

[21] Appl. No.: 08/764,409

[22] Filed: Dec. 11, 1996

[51] Int. Cl.⁶ .............................. G02F 1/00; H04N 3/27; H04N 5/46

[52] U.S. Cl. .................... 348/750; 348/771; 348/761; 348/764; 348/448

[58] Field of Search .................................. 348/448, 771, 348/761, 764, 750, 554, 555, 556, 557, 558, 706

[56] References Cited

U.S. PATENT DOCUMENTS

| | | | |
|---|---|---|---|
| 5,488,431 | 1/1996 | Gove et al. | 348/716 |
| 5,490,009 | 2/1996 | Venkateswar et al. | 348/755 |
| 5,526,051 | 6/1996 | Gove et al. | 348/388 |
| 5,671,018 | 9/1997 | Ohara et al. | 348/458 |
| 5,777,589 | 7/1998 | Gale et al. | 348/771 |

*Primary Examiner*—John K. Peng
*Assistant Examiner*—Paulos M. Natnael
*Attorney, Agent, or Firm*—Charles A. Brill; Frederick J. Telecky, Jr.; Richard L. Donaldson

[57] ABSTRACT

A baseline display system (10) is capable of receiving different types of input signals, analog or digital, having different horizontal and vertical input resolutions. The system uses serial video processors (SVPs) (33, 34, 43, 83) that have a given input size and spatial light modulators (SLMs) (18) that have a given output (display) resolution- The baseline system (10) is configurable to meet bandwidth requirements for displaying real time images on SLMs of increasing resolution. Data is decimated (downscaled) when appropriate to fit the SVP input size (FIGS. 4 and 8) and upscaled, vertically or horizontally, when appropriate to fit the SLM display resolution (FIGS. 3, 4, 7, and 8). Four systems (20, 50, 60, 90), each appropriate for a different SLM resolution are described.

20 Claims, 7 Drawing Sheets

DMD-BASED PROJECTOR FOR INSTITUTIONAL USE

TECHNICAL FIELD OF THE INVENTION

This invention relates to image display systems using spatial light modulators (SLMs), and more particularly to a projection display system designed for high brightness, high contrast applications, such as displays in meeting rooms and lecture halls.

BACKGROUND OF THE INVENTION

Video display systems based on spatial light modulators (SLMs) are increasingly being used as an alternative to display systems using cathode ray tubes (CRTs). SLM systems provide high resolution displays without the bulk and power consumption of CRT systems Digital micromirror devices (DMDs) are a type of SLM, and may be used for projection display applications The images provided by a DMD compare favorably with those provided by CRTs and can be projected to a screen in dimensions surpassing today's large screen televisions A DMD has an array of micro-mechanical display elements, each having a tiny mirror that is individually addressable by an electronic signal. Depending on the state of its addressing signal, each mirror tilts so that it either does or does not reflect light to the image plane, thereby modulating light incident on the DMD. The mirrors may be generally referred to as "display elements", which correspond to the pixels of the image that they generate. Generally, displaying pixel data is accomplished by loading memory cells connected to the display elements. The display elements can maintain their on or off state for controlled display times. Other SLMs operate on similar principles, with an array of display elements that may emit or reflect light simultaneously, such that a complete image is generated by addressing display elements rather than by scanning a screen. Another example of an SLM is a liquid crystal display (LCD) having individually driven display elements.

For all types of SLMs, motion displays are achieved by updating the data in the SLM's memory cells at sufficiently fast rates. To achieve intermediate levels of illumination, between white (on) and black (off), pulse-width modulation (PWM) techniques are used. The basic PWM scheme involves first determining the rate at which images are to be presented to the viewer. This establishes a frame rate and a corresponding frame period. For example, in a standard television system, images are transmitted at 30 frames per second, and each frame lasts for approximately 33.3 milliseconds. Then, the intensity resolution for each pixel is established. In a simple example, and assuming n bits of resolution, the frame time is divided into $2^n-1$ equal time slices. For a 33.3 millisecond frame period and n-bit intensity values, the time slice is $33.3/(2^n-1)$ milliseconds.

Having established these times, for each pixel of each frame, pixel intensities are quantized, such that black is 0 time slices, the intensity level represented by the LSB is 1 time slice, and maximum brightness is $2^n-1$ time slices. Each pixel's quantized intensity determines its on-time during a frame period. Thus, during a frame period, each pixel with a quantized value of more than 0 is on for the number of time slices that correspond to its intensity. The viewer's eye integrates the pixel brightness so that the image appears the same as if it were generated with analog levels of light.

For addressing SLMs, PWM calls for the data to be formatted into "bit-planes", each bit-plane corresponding to a bit weight of the intensity value. Thus, if each pixel's intensity is represented by an n-bit value, each frame of data has n bit-planes. Each bit-plane has a 0 or 1 value for each display element. In the PWM example described in the preceding paragraphs, during a frame, each bit-plane is separately loaded and the display elements are addressed according to their associated bit-plane values. For example, the bit-plane representing the LSBs of each pixel is displayed for 1 time slice, whereas the bit-plane representing the MSBs is displayed for 2n/2 time slices.

SLM-based display systems can be all-digital in the sense that, except for A/D conversion of analog inputs at the front end, all data processing as well as the display process are digital. Display systems are being developed that optimize this all-digital capability.

SUMMARY OF THE INVENTION

One aspect of the invention is a projection display system for displaying images from data obtained from an input signal that may be one of a variety of input signals, each having a different horizontal and vertical input resolution. The system uses serial video processors (SVPs) having a given input size and spatial light modulators (SLMs) having a given vertical and horizontal output resolution. An analog signal interface provides YUV or RGB data if the input signal is an analog input signal. It detects a signal type of the analog input signal and provides a control signal indicating the signal type, and has an analog-to-digital converter that samples the analog input signal- A YUV-data processing unit receives the YUV data and the control signal. It has a first and a second SVP that perform interlaced to progressive scan conversion in response to the control signal. A digital signal interface provides RGB data if the input signal is a digital input signal. It detects a signal type of the digital input signal and provides a control signal indicating the signal type. It provides the RGB data on three data paths, one data path for each RGB color. An RGB-data processing unit receives THE ROB data and the control signal. It has three duplicate sets of components, one for each data path from the digital signal interface. Each set of components has FIFO (first-in first-out) memories for creating multiple subpaths within the RGB-data processing unit, down-scaling processors for decreasing the horizontal input resolution to the SVP input size, and an SVP for performing vertical scaling in response to the RGB control signal. A picture quality unit receives data from both the YUV-data processing unit and the RGB-data processing unit. It has a matrix multiplier for performing color space conversion if the data is YUV data, a look-up table for performing de-gamma, and FIFO memories for providing data to a frame memory on multiple data paths, thereby providing display-ready RGB data. A frame memory has formatting circuitry for formatting the display-ready RGB data into bit-plane format and has memory cells for storing the display-ready RGB data for delivery to the SLMs. Three SLMs, one for each color, generating images based the display-ready RGB data. A timing unit is in data communication with each of the above elements of the system. It receives the control signal from either the analog or the digital interface and delivers timing signals in response to the control signal.

A technical advantage of the invention is that it provides a DMD-based projection display system that is suitable for institutional and professional applications, such as in auditoriums. The display is bright even when projected to a very large screen, and the picture quality meets high performance expectations.

The system is capable of providing displays from a variety of different input signals. It has separate front end data paths for YUV and RGB data. This permits the same YUV components to be used as are used for television display systems. The use of two paths also increases available SVP programming capacity for scaling functions. The two paths will permit the system to be easily modified for overlaying images from the two paths. Developments in digital RGB inputs or in other inputs such as HDTV, can be accommodated without affecting the YUV data path. The system can also receive data that is already processed.

With respect to the data processing units, serial video processors (SVPs) are used for interlaced scan to progressive scan conversion of YUV data and for scaling both YUV data and RGB data. The system is designed so that all data processing stays within bandwidth limitations of its internal components. This may require the data to be modified to match the SVP size (by horizontal down-scaling) as well as the SLM resolution (by horizontal or vertical scaling).

The system is easily adaptable to SLMs having different resolutions. For SLMs having higher resolutions, the system is configured to meet bandwidth requirements for producing images at video rates. In general, the larger the SLM resolution, the greater the bandwidth required for real time displays. The required data throughput for picture quality processing, frame memory, and formatting is achieved with parallel data paths. As higher resolution SLMs become available and in demand, the underlying architecture will support their use without new component designs.

DETAILED DESCRIPTION OF THE INVENTION

Overview of SLM-Based Projection Display System

Figure 1:
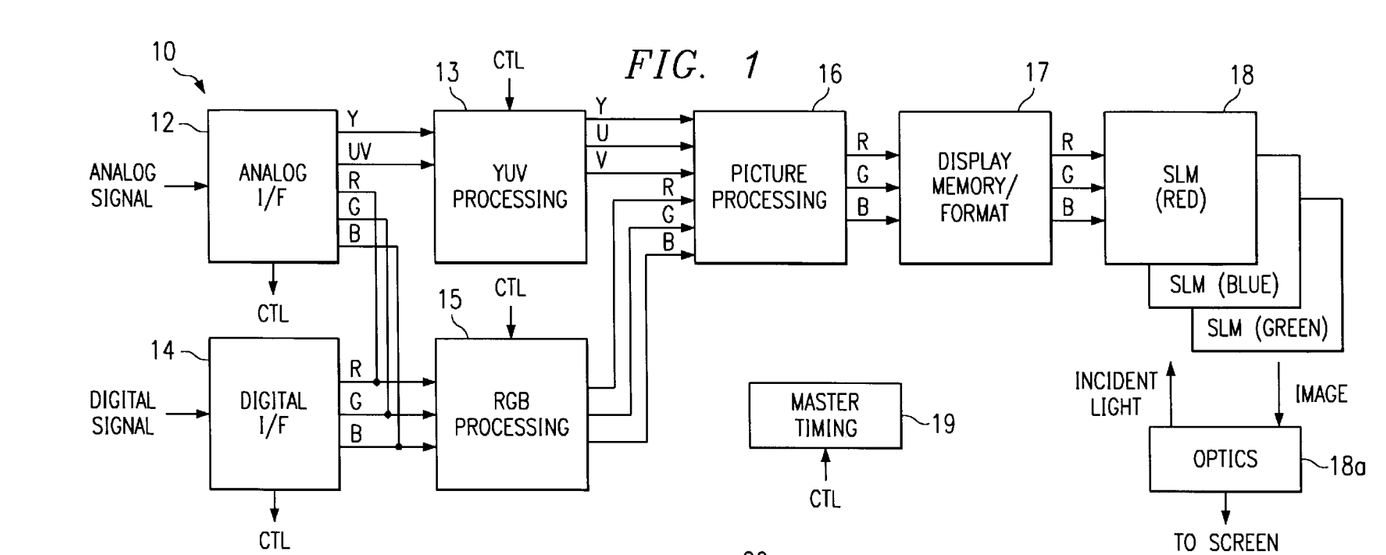
FIG. 1 is a block diagram of the baseline components of a projection display system in accordance with the invention.

FIG. 1 is a block diagram of a projection display system 10, which uses multiple SLMs 18 to generate real-time images from a YUV or an RGB video signal. Three SLMs 18 each generate an image of a different color—red, green, and blue—with the images combined for a full color display. Only those components significant to main-screen pixel data processing are shown. Other components, such as might be used for processing synchronization and audio signals or secondary screen features, such as closed captioning, are not shown.

For purposes of this description, system 10 has DMD-type SLMs 18. Comprehensive descriptions of DMD-based digital display systems, without features of the present invention, are set out in U.S. Pat. No. 5,079,544, issued Jan. 1, 1992, entitled "Standard Independent Digitized Video System", in U.S. Pat. No. 5,526,051 issued Jun. 11, 1996, entitled "Digital Television System", and in U.S. Pat. No. 5,452,024, issued Sep. 9, 1995, entitled "DMD Display System." Each of these patents and patent applications is assigned to Texas Instruments Incorporated, and each is incorporated by reference herein. System 10 could also be used with other types of SLMs that have operating characteristics similar to DMDs, notably, the use of RGB bit-plane data.

The invention is directed to a system 10 that is capable of receiving input signals from a variety of sources. The input may be analog, resulting in YUV or RGB data, or digital, resulting in RGB data. Each type of data has its own front-end data path, comprised of a signal interface 12 or 14 and a processing unit 13 or 15.

Both YUV-data processing unit 13 and RGB-data processing unit 15 may be implemented with one or more processors of a type known as serial video processors (SVPs). The SVP is a programmable processor manufactured by Texas Instruments Incorporated. The core of the SVP is a one dimensional array of one-bit processing elements, which form a SIMD architecture. Each processing element corresponds to one pixel of a line of video data. In the example of this description, each SVP processes 960 pixels. Each SVP has a 40 bit wide data input register and a 24 bit wide data output register. Data input, computation, and data output are concurrent operations. The data rates of the input and output registers are both 33 MHZ. As explained below, the SVPs include memory for storing programming, and depending on the type of input signal, programming appropriate for that signal is selected and executed.

A feature of the invention is the use of SVPs in YUV processing unit 13 and in RGB processing unit 15 in a manner that permits high resolution images. If the number of active pixels per row of the SLMs 18 exceeds the number of processing elements of the SVP, a down-scaling process is performed before the data enters the SVP. If the required processing exceeds the programming capability of a single SVP, multiple SVPs are connected serially, each programmed to perform different functions.

Another feature of the invention is re-useability of components. As explained below, for a given system 10, each SLM 18 has a specific image resolution, which means that it displays each image using a certain number of display elements per row (horizontal resolution) and a certain number of rows per frame (vertical resolution). This image resolution determines how system 10 must be configured to meet data rate requirements for real time displays. Processing as well as parts configuration is also affected by the SLM resolution. Data may be down-sampled to fit the SVP size and then upscaled to fit the horizonal resolution of SLMs 18. Both types of horizontal scaling (down-scaling and upscaling) may be implemented with parts having the same basic architecture. As the resolution of SLMs 18 increases, system 10 is easily modified by using parallel data paths for picture quality, frame buffering, and formatting tasks.

Referring to the specific components of FIG. 1, analog interface 12 receives an analog video signal, such as an NTSC, PAL, SECAM, or 4.43 NTSC signal. The following table lists these analog input signals, the number of active lines per frame in the source, and the number of rows displayed by each SLM 18.

| Video Format | Source Line Resolution | DMD Display Resolution |
|---|---|---|
| NTSC | 483 | 1280 × 960 |
| PAL | 577 | 1536 × 1080 |
| SECAM | 577 | 1536 × 1080 |
| Wide NTSC | 483 | 1706 × 960 |

These signals arrive as interlaced fields, with alternating fields of even rows and odd rows. Each of these signals result in color difference (YUV) data. As indicated in FIG. 1, it is also possible that the analog input signal could be an RGB signal, resulting in RGB data. In this case, the analog interface 12 would provide RGB data to RGB-data processing unit 15 rather than to YUV processing unit 13.

Analog interface 12 detects the type of input signal, and delivers a control signal to timing unit 19 to indicate the field rate, line rate, and sample rate. It also delivers a control signal to YUV-data processing unit 13 (for YUV data) or to RGB-data processing unit 15 (for RGB data), for selecting the appropriate processing for that type of signal. Analog interface 12 separates video, synchronization, and audio signals. It includes components for A/D conversion and Y/UV separation, by which the signal is converted to pixel-data samples and the luminance ("Y") data is separated from the chrominance ("UV") data. The signal may be converted to digital data before Y/UV separation, or Y/UV separation could be performed before A/D conversion. Regardless of the order of Y/UV separation and A/D conversion, the output is referred to herein as "YUV data" and is comprised of data representing luminance and chrominance information.

Analog interface 12 supports different input signals by sampling the analog signal at different pixel rates. Color-difference signals, such as NTSC signals, may be sampled in accordance with color burst rates, and if there are a different number of samples than the horizontal resolution of SLMs 18, pixels may be added or removed by YUV processing unit 13. Alternatively, the luminance component may be sampled by simply dividing the active line period into the appropriate number of sample for the horizontal resolution of SLMs 18, and the chrominance component sampled at the color burst rate and later scaled. This latter method is described in U.S. Pat. No. 5,347,321, issues Sep. 13, 1994 entitled "Color Separator for Digital Television System". Another sampling method is described in U.S. Pat. Ser. No. 60/003,045, entitled "Color Demodulation for Digital Television." This patent and patent application are assigned to Texas Instruments Incorporated and are incorporated by reference herein. A sample rate of less than 75 Mps will maintain TTL logic throughout the system 10. Greater sample rates can be achieved by using ECL to TTL conversion after the appropriate bandwidth reduction using FIFO memory. The data provided by analog interface 12 has a certain horizontal and vertical data resolution, which may or may not be down-sampled or upscaled, depending on the size of the resolution compared to the input size of any SVP(s) used for processing the data and the image resolution of the SLMs 18.

YUV-data processing unit 13 prepares the YUV data for display, by performing various data processing tasks. Processing unit 13 may include whatever processing memory is useful for such tasks, such as field and line buffers. The tasks performed by processing unit 13 include conversion from interlaced to progressive scan format (proscan), scaling, and sharpness control. Interlaced to progressive scan conversion operates on interlaced fields of input data, and generates new data to fill in odd lines of even fields and even lines of odd fields. Scaling is the process of changing image resolution, with horizontal scaling changing the number of active pixels per line and vertical scaling changing the number of active lines per frame.

If the input signal is digital data, a digital interface 14 receives the data and detects the type of input signal. It delivers a control signal to timing unit 19 indicating the frame rate and horizontal and vertical resolution, as well as a control signal to RGB-data processing unit 15 to select the appropriate processing. It also performs whatever buffering and timing tasks are needed to prepare the data for processing. This data is assumed to be progressively scanned RGB data, such as are the VGA and SVGA formats. Like the YUV data, the RGB data provided by digital interface 14 has a certain horizontal and vertical data resolution, which may or may not be down-sampled or upscaled, depending on the size of the resolution compared to the input size of the SVP(s) used for processing the data and the image resolution of the SLMs 18.

RGB-data processing unit 15 receives RGB data from either analog interface 12 or digital interface 14. It prepares the RGB data for display, and may include whatever processing memory is useful for such tasks, such as field and line buffers. The tasks performed by RGB-data processing unit 15 include scaling, sharpness control, and aperture correction.

Picture quality unit 16 performs tasks such as color space conversion and de-gamma. Colorspace conversion converts Y/C data to RGB data. De-gamma undoes gamma correction in signals intended for CRT displays and is required because unlike CRTs, DMDs are linear displays with no inherent gamma characteristics.

Display memory/format unit 17 receives processed pixel data from picture quality unit 16. It formats the data, on input or on output, into "bit-plane" format, and delivers the bit-planes to SLMs 18 one at a time. One SLM 18 receives red bit-planes, one SLM 18 receives blue bit-planes, and the third SLM 18 receives green bit-planes. As discussed in the Background, the bit-plane format permits each display element of SLMs 18 to be turned on or off in response to the value of 1 bit of data at a time. In system 10, this formatting is performed by hardware associated with display memory/format unit 17. However, in other embodiments, the formatting could be performed by processor units 13 and 15 or by dedicated formatting hardware in the data path before or after display memory/format unit 17.

In a typical display system 10, display memory/format unit 17 has a "double buffer" memory, which means that it has a capacity for at least two display frames. The buffer for one display frame can be read out to SLMs 18 while the buffer another display frame is being written. The two buffers are controlled in a "ping-pong" manner so that data is continuously available to SLMs 18.

The bit-plane data from display memory/format unit is delivered to SLMs 18. Details of a suitable SLM 18 are set out in U.S. Pat. No. 4,956,619, issued Sep. 11, 1990 entitled "Spatial Light Modulator", which is assigned to Texas Instruments Incorporated and incorporated by reference herein. Essentially, each SLM 18 uses the data from display memory/format unit 17 to address each display element of its display element array. The "on" or "off" state of each display element forms an image. The data for different colors (red, green, and blue) is concurrently used to display three images, one on each SLM 18.

Display optics unit 18a has optical components for illuminating SLMs 18 and for receiving the image from SLMs 18. The images from SLMs 18 are combined by display optics unit 18a to produce a single image.

Master timing unit 19 provides various system control functions. Timing unit 19 is implemented with a field programmable gate array (FPGA), to handle different frame resolutions and frame rates. As stated above, it receives a control signal from analog interface 12 or from digital interface 14 indicating the type of input signal, so that a corresponding frame rate, line rate, and sample rate (if analog) can be selected. The display frame rate of SLMs 18 is locked to the frame rate of the input signal. For high frame rates, the data resolution (bits per pixel) may be reduced for processing.

FIGS. 2–11 illustrate four variations of system 10, each suitable for a system 10 having SLMs 18 of a different resolution, identified in order of increasing resolution, as Resolution Levels 1, 2, 3, and 4. For Resolution Levels 3 and 4, YUV-data processing unit 13 and RGB-data processing unit 15 are modified from those of Levels 1 and 2. For Resolution Levels 3 and 4 picture quality unit 16 is used in parallel paths. For Resolution Levels 2, 3, and 4, the display memory/format unit 17 uses special DMDRAM devices in parallel instead of a VRAM as does a Level 1 system.

Resolution Level 1

Figure 2:
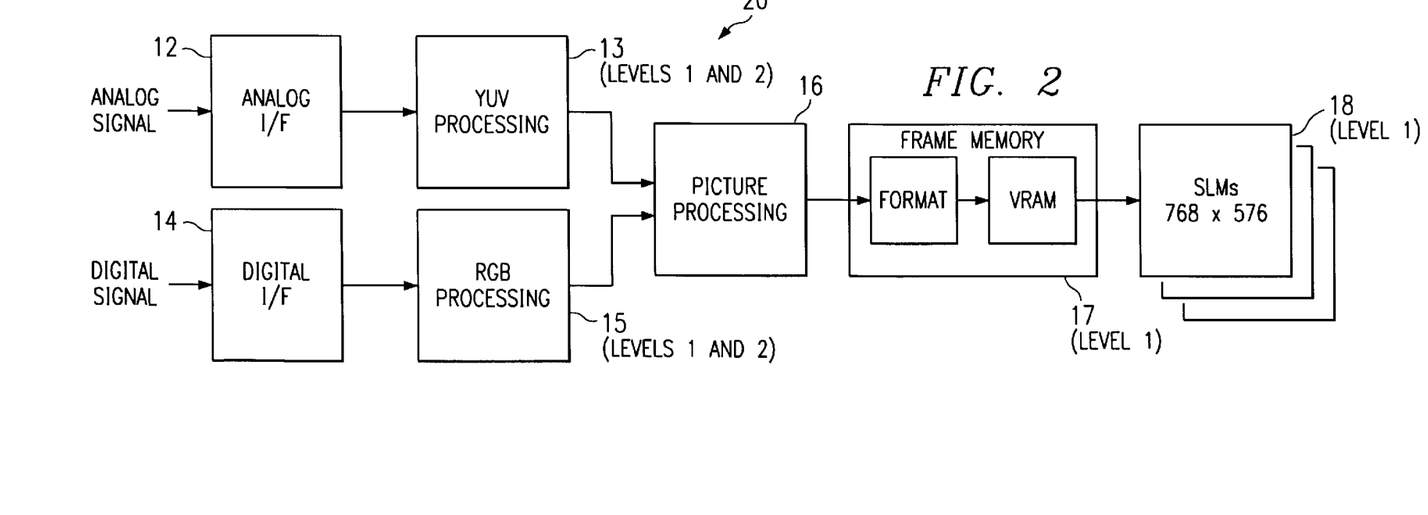
FIG. 2 is a block diagram of a display system configured for SLMs having a resolution of 768×576.

FIG. 2 is a block diagram of display system 20, configured for SLMs 18 having a resolution of 768×576 (Resolution Level 1). Referring to both FIGS. 1 and 2, system 20 has the same basic components as system 10, but the YUV-data processing unit 13, RGB-data processing unit 15, and display memory/format unit 17 are specific to 768×576 SLMs 18.

Figure 3:
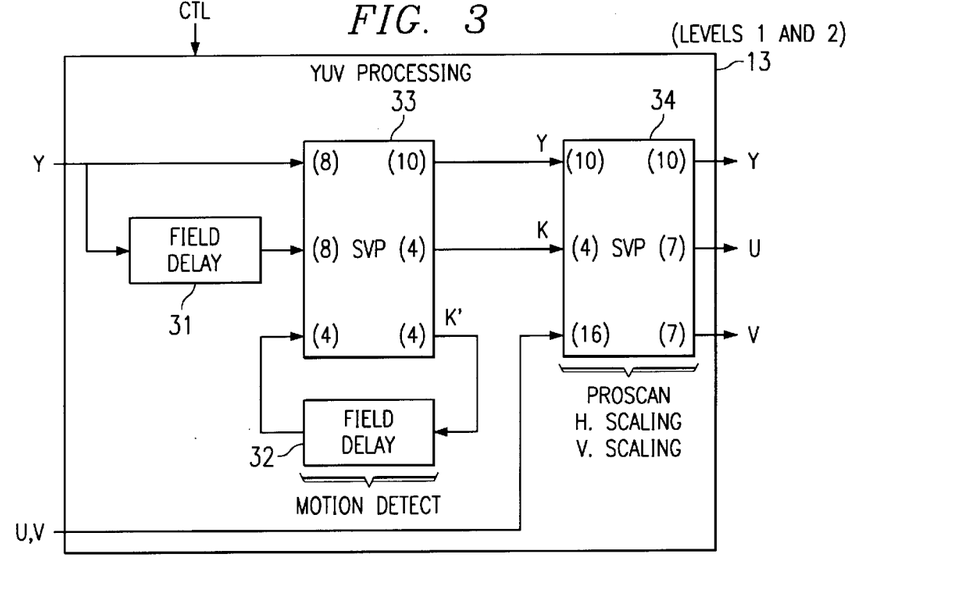
FIG. 3 is a block diagram of the YUV-data processing unit of the system of FIG. 2

FIG. 3 is a block diagram of the YUV-data processing unit 13 of system 20. Referring to both FIGS. 2 and 3, YUV-data processing unit 13 comprises two field delay memories 31 and 32 and two SVPs 33 and 34. The SVPs 33 and 34 implement a motion adaptive interlaced to progressive scan conversion process, where the method of generating additional rows of pixel data varies depending on whether there is motion in successive images. The field delay memories 31 and 32 and a first SVP 33 are used to obtain a motion value, K', for every pixel. The second SVP 34 generates pixel data to fill in odd rows of even-row fields and even rows of odd-row fields. A method of performing motion adaptive interlaced to progressive scan conversion with an SVP processor is described in U.S. Pat. Ser. No. 08/147,249, referenced above. Essentially, 4-bit K values, as well as 8-bit pixel values for a current field and a delayed field are used to generate new 10-bit pixels.

SVP 34 may be further programmed to perform vertical or horizontal scaling if the data does not fit the SLM size. A method of performing vertical scaling with an SVP processor is described in U.S. Pat. Ser. No. 08/147,249, referenced above. Typically, the data will be sampled at a rate resulting in fewer samples per line than the horizontal resolution of SLMs 18. Thus, horizontal scaling will be some sort of interpolation process to generate additional pixels If the data were sampled at a rate that resulted in more pixels per line than the row size of SVP 33, YUV processing unit 13 would have an additional processor (not shown) to reduce the number of pixels per line before the data is input to SVP 33.

For YUV-data processing, the luminance and chrominance data can be processed at different bit-depths. For example, luminance data, which is more perceivable to the eye, can be processed as 10-bit data with chrominance data being processed as 7-bit data.

Figure 4:
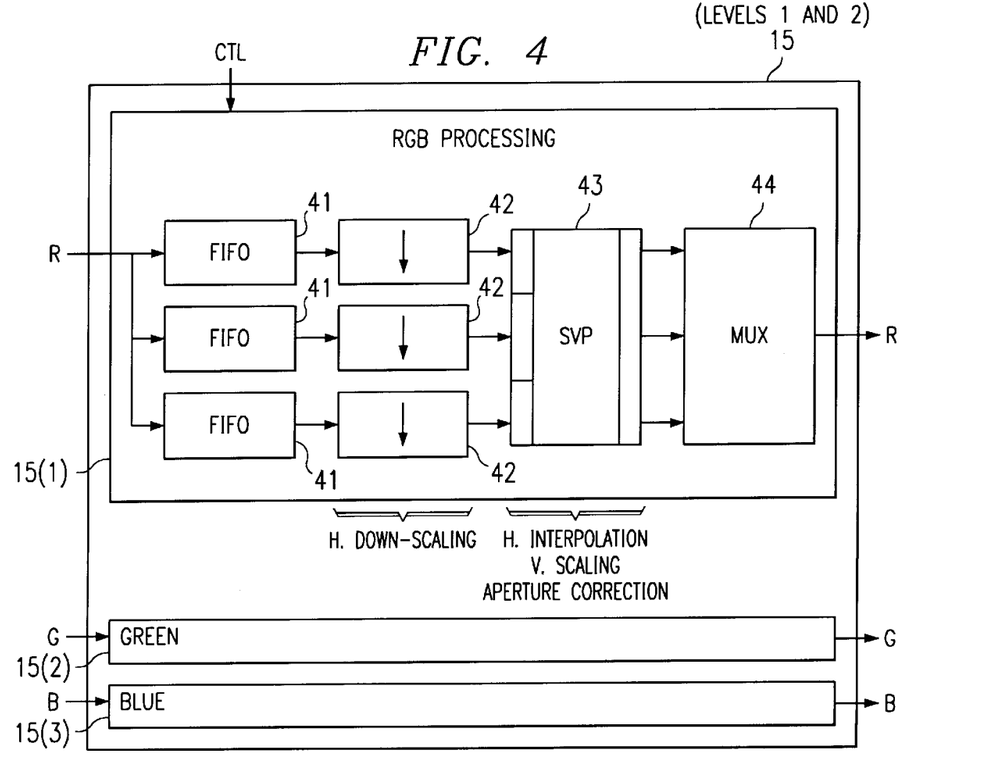
FIG. 4 is a block diagram of the RGB-data processing unit of the system of FIG. 2.

FIG. 4 is a block diagram of the RGB-data processing unit 15 of display system 20. The data for each color follow a different data path. These three data paths have identical subunits, identified as subunits 15(1), 15(2), and 15(3). Referring to both FIGS. 2 and 4, RGB-data processing unit 15 is used for digital scaling. FIFOs 41 are double-row FIFOs, which buffer data to reduce the data rate from digital interface 14. The three FIFOs 41 divide the input data rate by a factor of 3. A first FIFO 41 receives the data for row 1, then a second FIFO receives the data for row 2, then a third FIFO receives the data for row 3. After the first three rows are received in this manner, data can be delivered from each FIFO 41 to one of three down-scaling processors 42 along three parallel channels. As data for one row is being read out of a FIFO 41, data for a new row can be written in.

Down-scaling processors 42 are used to reduce the data if there are too many pixels per row to fit into SVP 43. For example, if SVP 43 has 960 processing elements and the data has more than 960 samples per line, the data must be downsampled. This downsampling can be as simple as simply removing the data for the extra pixels. Down-scaling processors 42 can be implemented as hardwired logic devices or with programmable processing devices. A technique known as horizontal polyphase resampling may be used for the down-scaling process. As explained below in connection with FIGS. 7 and 8, this technique may also be used for upscaling in higher resolution systems and permits processors 42 to have the same architecture as other horizontal scaling processors.

SVP processor 43 performs vertical scaling and aperture correction. It may also perform horizontal interpolation for input data if the number of samples per lines is less than the number of pixels per row of SLMs 18. The input register of SVP 43 receives data from down-scaling processors 42 simultaneously, such that data for three different rows is being input in parallel.

Within each subunit 15(1)–15(3) of RGB-data processing unit 15, each RG or B data path is split into three subpaths. After processing, a multiplexer 44 combines the subpaths back into RG or P data paths.

Referring again to FIG. 2, for system 20, memory/format unit 17 has a formatter and a VRAM memory, which are two separate devices. The formatter is a field programmable gate array (FPGA), programmed to format the data into bit-planes. A total of 36 4-Mbit VRAM devices are required- Resolution Level 2

Figure 5:
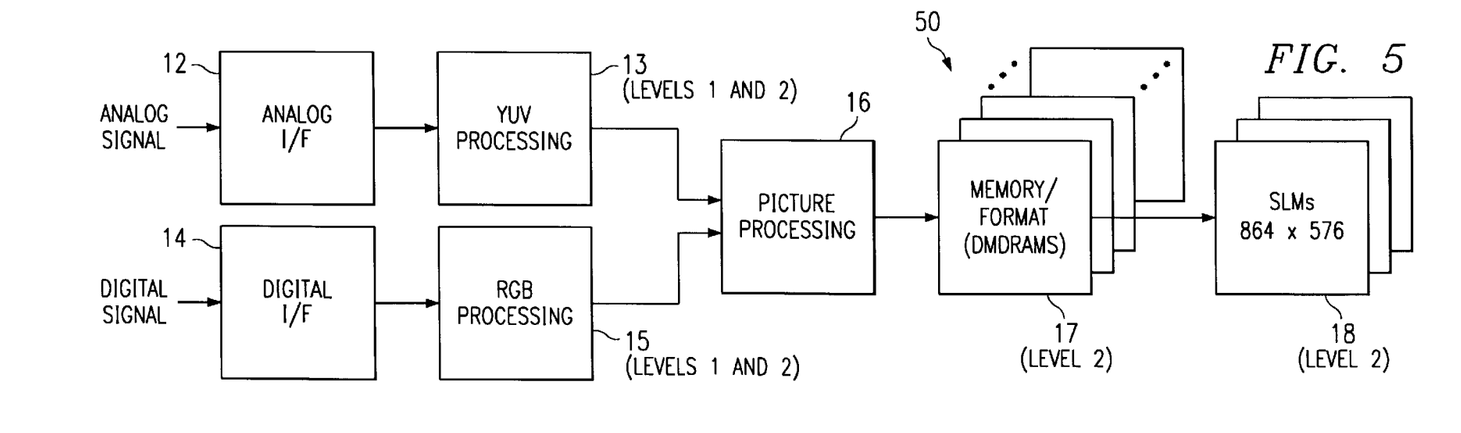
FIG. 5 is a block diagram of a display system configured for SLMs having a resolution of 864×576.

FIG. 5 is a block diagram of a display system 50, configured for SLMs 18 having a resolution of 864×576 (Resolution Level 2). Referring to both FIGS. 2 and 5, system 50 is similar to system 20, but has a different memory/format unit 17.

For 864×576 SLMs 18, memory/format unit 17 is comprised of DMDRAMs, which are an application specific device (ASIC). An example of a suitable DMDRAM is described in U.S. Pat. Ser. No. 08/160,344, entitled "Digital Memory for Display System Using Spatial Light Modulator", assigned to Texas Instruments Incorporated and incorporated by reference herein. The DMDRAM described therein has an format on output feature but the format could alternatively be performed on input.

For Level 2 SLMs, 4 DMDRAM devices are required per SLM 18. Thus, for the three SLMs 18, a total of 12 DMDRAM devices are used in system 50.

Resolution Level 3

Figure 6:
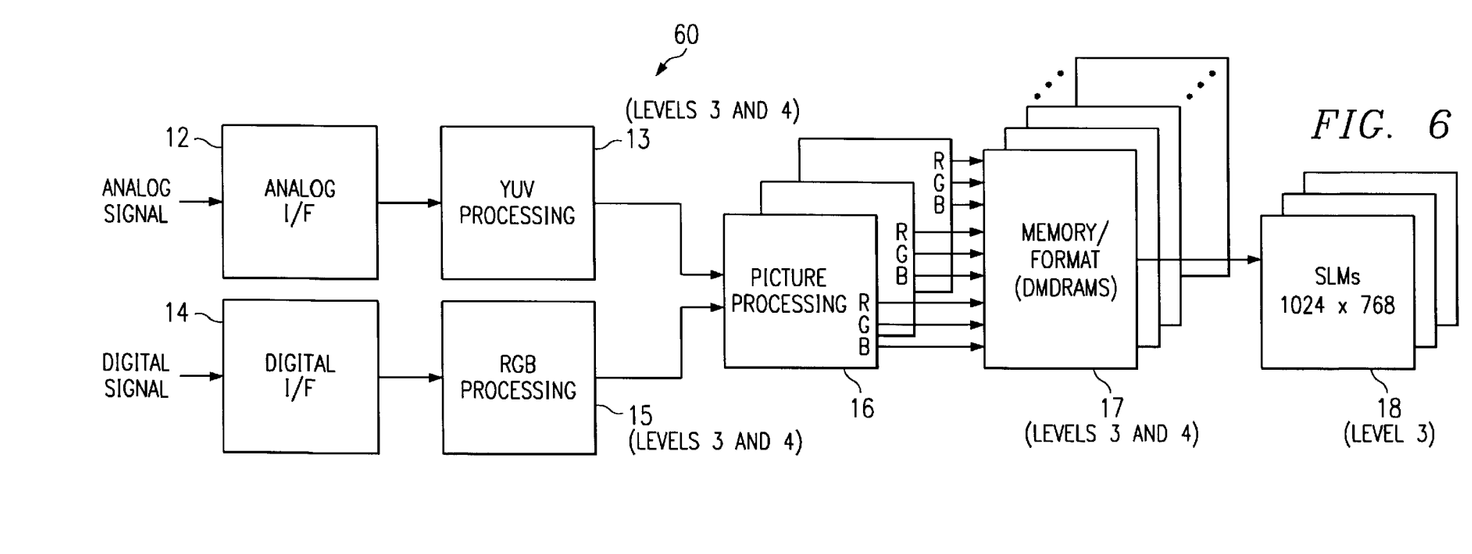
FIG. 6 is a block diagram of a display system configured for SLMs having a resolution of 1024×768.

FIG. 6 is a block diagram of a display system 60, configured for SLMs 18s having a resolution of 1024×768 (Resolution Level 3). Referring to both FIGS. 1 and 6, system 60 has the same basic components as system 10, but the YUV-data processing unit 13, RGB-data processing unit 15, and display memory/format unit 17 are specific to 1024×768 SLMs 18.

Figure 7:
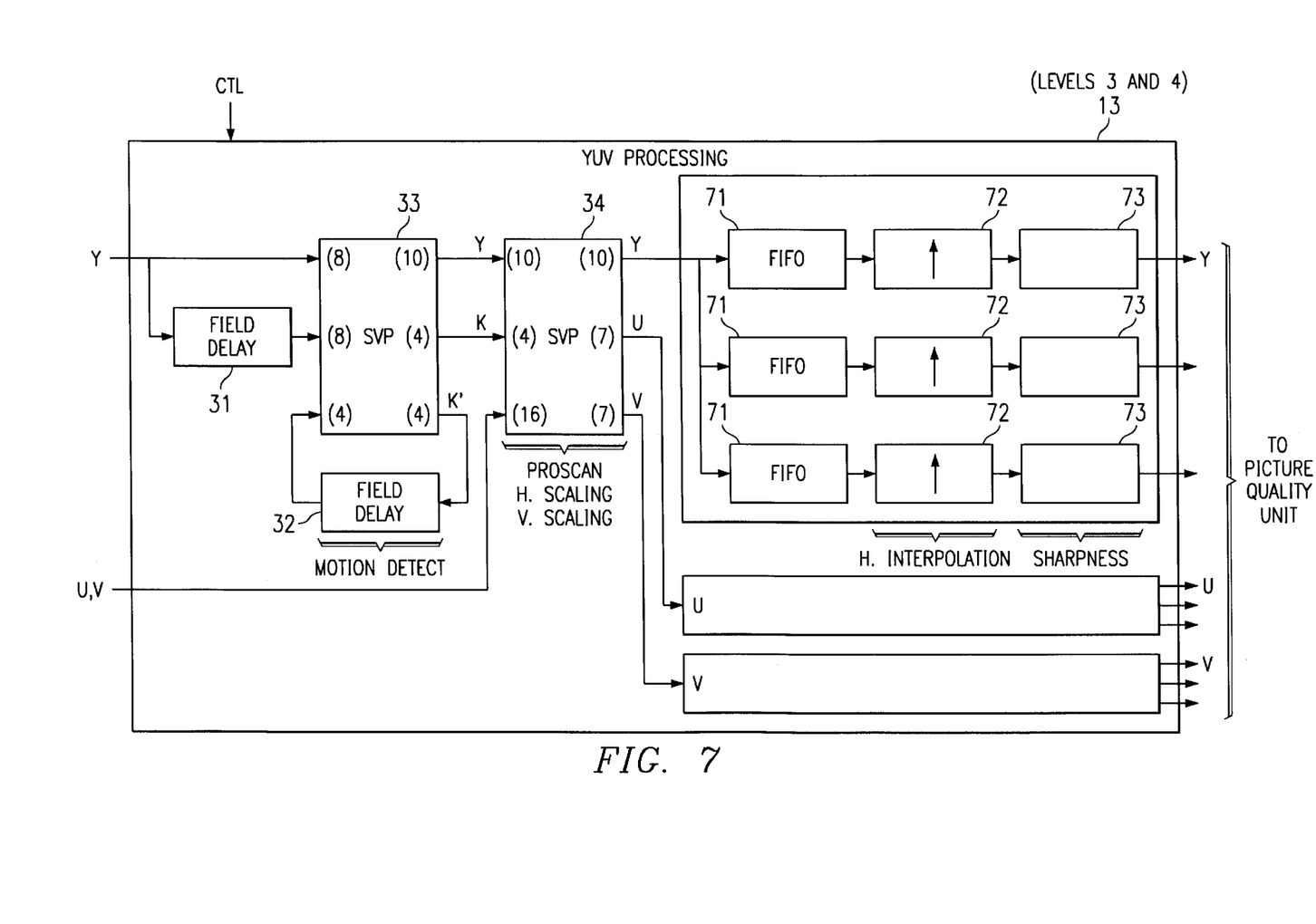
FIG. 7 is a block diagram of the YUV-data processing unit of the system of FIG. 6.

FIG. 7 is a block diagram of the YUV-data processing unit 13 of display system 60. Referring to both FIGS. 6 and 7, YUV-data processing unit 13 has the same unit 13 as do systems 20 and 50 for Levels 1 and 2. But for system 60, YUV-data processing unit 13 also accommodates the need to upscale the data for higher resolution SLMs 18. FIFOs 71 operate in a manner similar to FIFOs 41 of FIG. 4, each receiving every third row of data. Processors 72 and 73 perform horizontal interpolation and sharpness tasks, respectively. In this system 60, the second SVP would not perform any horizontal scaling, but rather this task is performed by processors 72. An example of a sharpness process is described in U.S. Pat. Ser. No. 08/147,249, referenced above.

Figure 8:
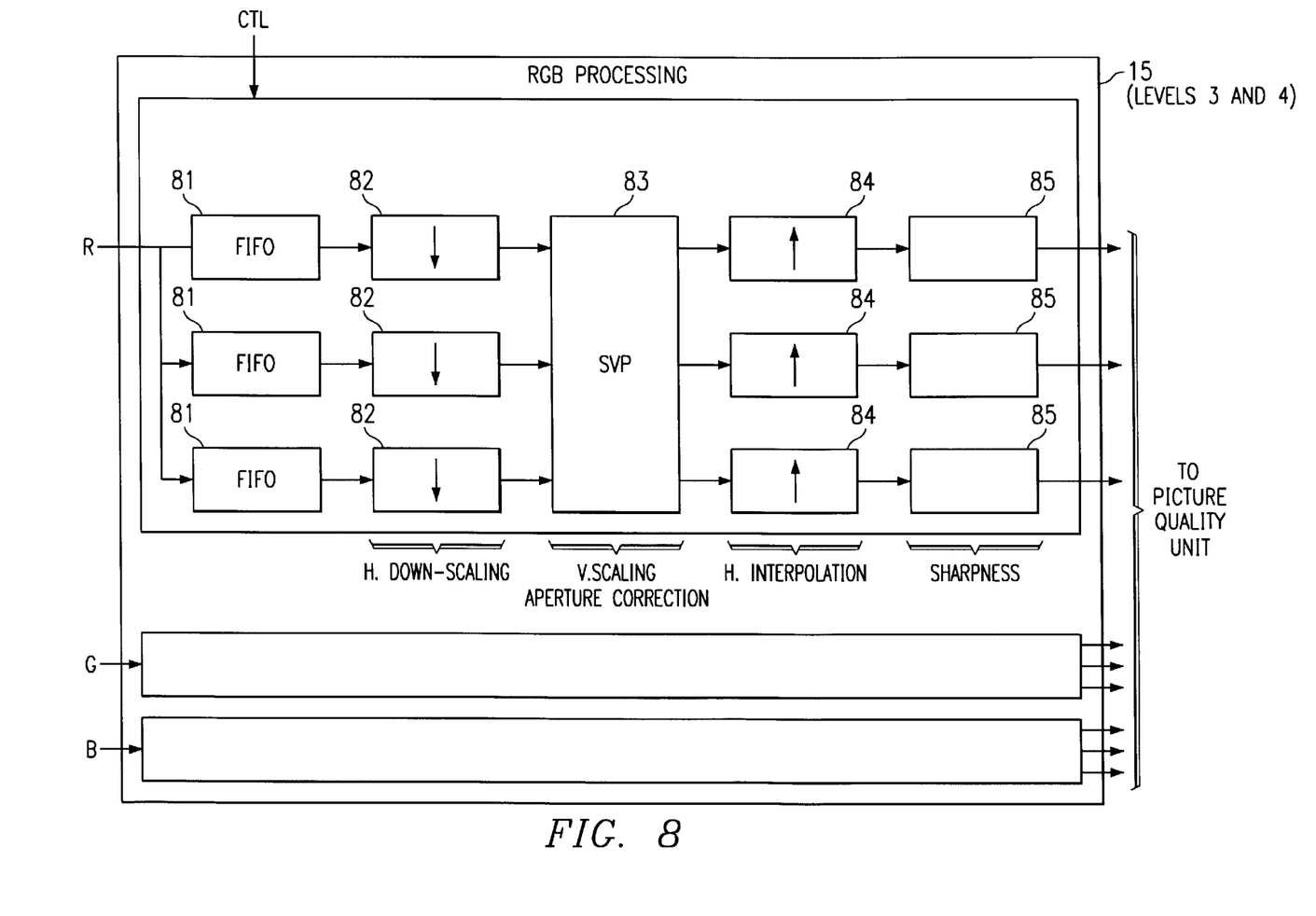
FIG. 8 is a block diagram of the RGB-data processing unit of the system of FIG. 6.

FIG. 8 is a block diagram of the RGB-data processing unit 15 of display system 60. The data for each color has an identical processing unit, identified as units 15(1), 15(2), and 15(3) Referring to both FIGS. 6 and 8, RGB-data processing unit 15 is similar to the RGB-data processing unit 15 of system 20, except that it has a processor 84, which upscales the data if it has been decimated to fit SVP 83. This upscaling is done by an interpolation process and results in the data having the same number of samples per line as display elements per row of SLMs 18. Processor 84 may also perform aperture correction, which is especially useful for font-intensive RGB data. For each color, data is output from processing unit 15 in three parallel paths.

In both FIGS. 7 and 8, the horizontal scaling processors 72, 82, and 84, may be implemented with hardwired logic or with programmable processors. As stated above, all horizontal scaling may use a horizontal polyphase resampling technique. This permits the horizontal scaling processors 72, 82, and 84 to have the same basic architecture as each other and as the down-scaling processor 42 in FIG. 4. An example of a suitable device for such scaling is the ACUITY device commercially available from Genesis Microchip Incorporated.

The memory of memory/format unit 17 for system 60 is comprised of the same DMDRAM devices described above for system 20. However, for system 60, 12 DMDRAM devices are required per SLM 18, for a total of 36 DMDRAM devices. The process of transferring data to memory/format unit 17 is described below in connection with FIG. 11.

Resolution Level 4

Figure 9:
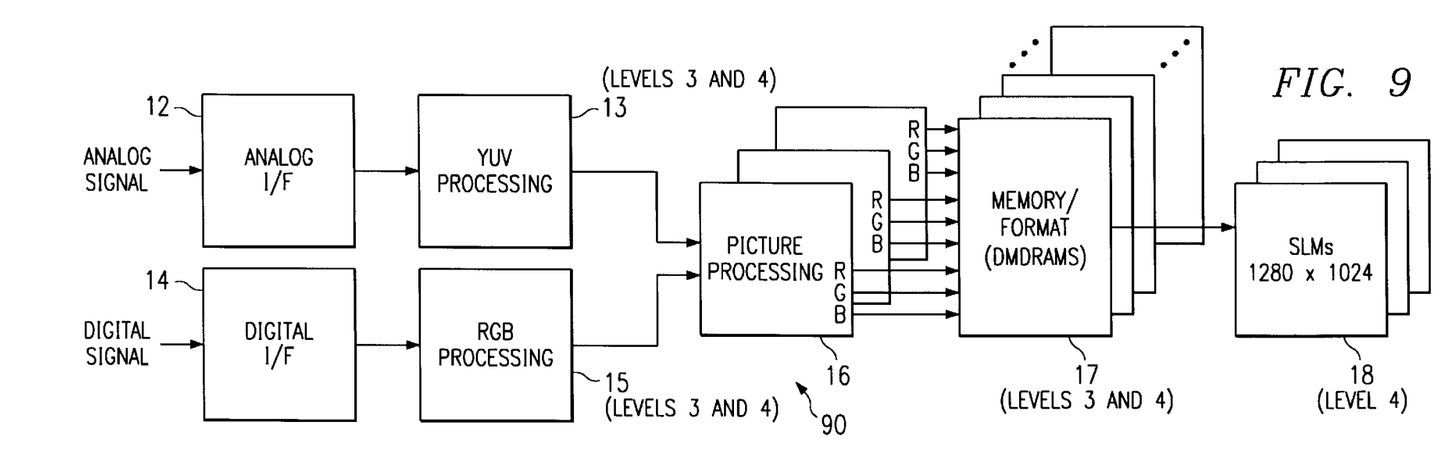
FIG. 9 is a block diagram of a display system configured for SLMs having a resolution of 1280×1024.

FIG. 9 is a block diagram of display system 90, configured for SLMs 18 having a resolution of 1280×1024 (Resolution Level 4). Other than SLMs 18, system 90 has the same components as system 60. However, because of the "wider" image, the data is more likely to require down scaling to fit the SVP of RGB-data processing unit and subsequent upscaling to match the horizontal resolution of SLMs 18.

Picture Quality Unit

Figure 10:
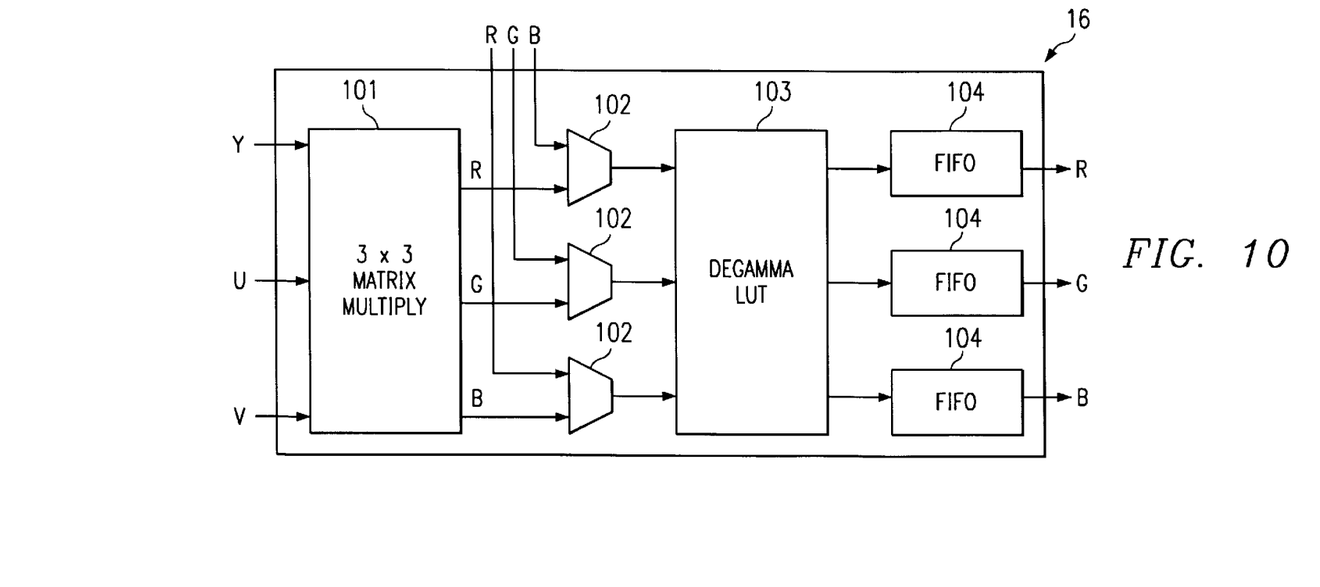
FIG. 10 is a block diagram of the picture quality unit of FIGS. 1, 2, 5, 6, and 9.

FIG. 10 is a block diagram of picture quality unit 16. Picture quality unit 16 is implemented as an application specific integrated circuit (ASIC) and used for all sizes of SLMs 18. As explained below, this ASIC combines multiplexing, colorspace, and de-gamma operations, and is referred to as an "MCD ASIC".

The ASIC for picture quality unit 16 is designed for Resolution Levels 1 and 2. For larger SLM resolutions, multiple ASICs are used, such that two or more channels of data are processed in parallel. For example, for Resolution Levels 3 and 4, three ASICs are used in parallel. As an example of using three ASICs to reduce the data rate, if the data rate out of processing unit 13 or 15 were 96 MHZ, it would be reduced to 32 MHZ. This is consistent with a 40 MHZ bandwidth limitation of memory/format unit 17.

Consistent with the preceding paragraph, for a Level 1 or 2 system 20 or 50, picture quality unit of FIG. 10 is a single ASIC that receives the entire frame line-by-line. For a Level 3 or 4 system 60 or 90, FIG. 10 illustrates one of three ASICs of picture quality unit 16, and this ASIC receives every third line of the frame.

Picture quality unit 16 receives both RGB data or YUV data (YUV data). YUV data is delivered to a 3×3 matrix multiplier 101, where color space conversation is performed. An example of an appropriate color space conversation process is described in U.S. Pat. Ser. No. 08/147,249, referenced above. The output of multiplier 101 is RGB data. The RGB data may arrive from RGB-data processing unit 15 or it may arrive directly-to picture quality unit 16 from an external source. RGB data bypasses matrix multiplier 101.

Although not shown in FIG. 10, data from a separate processing unit for on-screen display (OSD) can be multiplexed at the inputs to picture quality unit 16, either for RGB data or for YUV data.

Multiplexers 102, one for each color data path, select between data from the YUV data path, which is now RGB data, or from the RGB data path The selected data is delivered to a de-gamma look-up table (LUT) 103, which linearizes the data. This process is required to undo the gamma correction that is performed on video signals intended for CRT displays. An example of an appropriate de-gamma process is described in U.S. Pat. Ser. No. 08/147,249, referenced above.

From LUT 103, the RGB data goes to FIFO's 104, which buffer the data before transfer to memory/format unit 17. The data transfer process is explained below in connection with FIG. 11. Each of the three channels, RGB, drives four DMDRAMs of memory/format unit 17.

Memory/Format Unit (Resolution Levels 3 and 4)

As stated above, for Resolution Levels 3 and 4, the picture quality unit 16 is comprised of three MCD ASICs. Also, for Resolution Levels 3 and 4, the memory/format units 17 of systems 20 and 60 are comprised of multiule DMDRAM ASICs. For a Level 3 system 60 or Level 4 system 90, there are 36 DMDRAMs.

Figure 11:
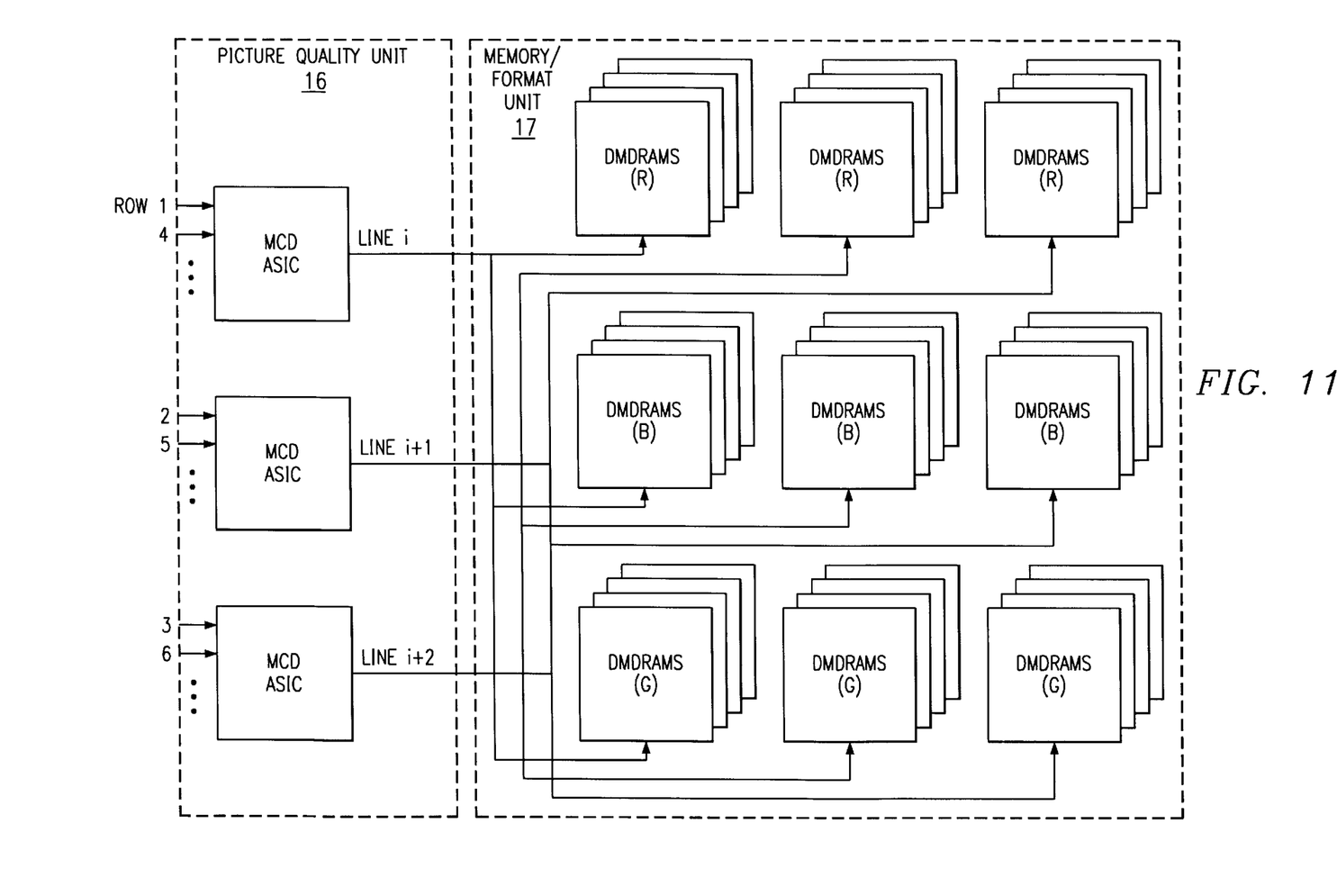
FIG. 11 is a block diagram of the data communication between the picture quality unit and the format/memory unit of FIGS. 6 and 9.

FIG. 11 illustrates the data communication between picture quality control unit 16 and memory format unit 17 of system 60 or 90.

The three duplicate processing MCD ASICs of picture quality unit 16 receive and process data for a different line of each frame. Where L is the number of lines per frame, a first MCD ASIC processes lines 1, 4, 7, . . . , L-2. A second MCD ASIC processes lines 2, 5, 8, . . . , L-1. A third MCD ASIC processes lines 3, 6, 9, . . . , L. Referring to both FIGS. 10 and 11, FIFOs 104 at the output of picture processing unit 16 store lines of data for delivery to frame memory/format unit 17. The three columns of DMDRAMs operate in parallel, such that at any given time, three lines of data are being read in to the DMDRAMs.

For system 50, which has Level 2 SLMs 18, the configuration would be similar to that of FIG. 11, but memory/format unit 17 would have 4 DMDRAMs per color rather than 4.

Other Embodiments

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A projection display system for displaying images from data obtained from an input signal that may be one of a variety of input signals, each having a different horizontal and vertical input resolution, said system using serial video processors (SVPs) having a given input size and spatial light modulators (SLMs) having a given vertical and horizontal output resolution, comprising:

an analog signal interface that provides YUV data if said input signal is a YUV analog input signal, that detects a signal type of said YUV analog input signal, that provides a YUV control signal indicating said signal type, and that has an analog-to-digital converter that samples said YUV analog input signal;

a YUV-data processing unit that receives said YUV data and said YUV control signal and that has a first and a second SVP for performing interlaced to progressive scan conversion in response to said YUV control signal;

a digital signal interface that provides RGB data if said input signal is a digital input signal, that detects a signal type of said digital input signal, that provides an RGB control signal indicating said signal type, and that provides said RGB data on three data paths, one of said data paths for each RGB color;

an RGB-data processing unit that receives said RGB data and said RGB control signal and that has three duplicate sets of components, one for each said data path from said digital signal interface, each said set of components having FIFO (first-in first-out) memories for creating multiple subpaths within said RGB-data processing unit, down-scaling processors for decreasing said horizontal input resolution to said SVP input size, and an SVP that scales said vertical input resolution in response to said RGB control signal;

a picture quality unit that receives said YUV data from said YUV-data processing unit or said RGB data from said RGB-data processing unit, said picture quality unit having a matrix multiplier for performing color space conversion of said YUV data, at least one multiplexer for selecting said YUV data from said matrix multiplier or said RGB data from said RGB processing unit, a look-up table for performing de-gamma, and FIFO memories for providing data to a frame memory on multiple data paths, thereby providing display-ready RGB data;

a frame memory having formatting circuitry for formatting said display-ready RGB data into bit-plane format and having memory cells for storing said display-ready RGB data for delivery to said SLMs;

three SLMs, one for each said color, for generating images based on display-ready RGB data in said bit-plane format; and a timing unit that receives said YUV control signal or said RGB control signal and delivers timing signals to said analog signal interface, said YUV-data processing unit, said digital signal interface, said RGB-data processing unit, said picture quality unit, said frame memory, and said SLMs in response to said control signal.

2. The system of claim 1, wherein said second SVP of said YUV-data processing unit scales said vertical input resolution in response to said YUV control signal.

3. The system of claim 1, wherein said YUV-data processing unit further comprises FIFOs that receive said YUV data from said second SVP and divides said YUV data onto multiple subpaths and further comprises a horizontal scaling processor on each of said multiple subpaths that scales said horizontal input resolution.

4. The system of claim 1, wherein said YUV-data processing unit increases the pixel resolution of the luminance component of said YUV data.

5. The system of claim 1, wherein said RGB-data processing unit further comprises a multiplexer that receives said RGB data from said SVP and combines said subpaths back into said three data paths.

6. The system of claim 1, wherein said RGB-data processing unit delivers said RGB data on said subpaths to said picture quality unit and wherein said picture quality unit has three duplicate data paths, each having said matrix multiplier, said look-up table, and said FIFO memories.

7. The system of claim 1, wherein said RGB-data processing unit further comprises a horizontal scaling processor on each of said subpaths that receives said RGB data from said SVP and horizontally scales RGB data.

8. The system of claim 1, wherein said picture quality unit is implemented with an application specific integrated circuit.

9. The system of claim 8, wherein said picture quality unit is duplicated for multiple data paths.

10. The system of claim 1, wherein said frame memory is comprised of a video random access memory (VRAM) and a formatting circuit.

11. The system of claim 1, wherein said frame memory is an application specific integrated circuit with said memory cells and said formatting circuitry integrated in a single device, said device being duplicated in accordance with the resolution of said SLMs.

12. The system of claim 1, wherein said analog signal interface further provides RGB data if said input signal is an RGB analog input signal, detects a signal type of said RGB analog input signal, provides said RGB control signal, and delivers said RGB data to said RGB-data processing unit.

13. A projection display system for displaying images from data obtained from an input signal that may be one of a variety of input signals, each having a different horizontal and vertical input resolution, said system using spatial light modulators (SLMs) having a given vertical and horizontal output resolution, comprising:

an analog signal interface that provides YUV data if said input signal is a YUV analog input signal, that detects a signal type of said YUV analog input signal, that provides a YUV control signal indicating said signal type, and that has an analog-to-digital converter that samples said YUV analog input signal;

a YUV-data processing unit that receives said YUV data and said YUV control signal, that has a first and a second serial video processor (SVP) for performing interlaced to progressive scan conversion in response to said YUV control signal, that has FIFOs that receive said YUV data from said second SVP and divide said YUV data onto multiple subpaths, and that has a horizontal scaling processor on each of said multiple subpaths that horizontally scales said YUV data in response to said YUV control signal;

a digital signal interface that provides RGB data if said input signal is a digital input signal, that detects a signal type of said digital input signal, that provides an RGB control signal indicating said signal type, and that provides said RGB data on three data paths, one of said data paths for each RGB color;

an RGB-data processing unit that receives said RGB data and said RGB control signal and that has three duplicate sets of components, one for each said data path from said digital signal interface, each said set of components having FIFO (first-in first-out) memories for creating multiple subpaths within said RGB-data processing unit, and a horizontal scaling processor on each of said subpaths that horizontally scales said RGB data in response to said RGB control signal;

a picture quality unit that receives said YUV data from said YUV-data processing unit or said RGB data from said RGB-data processing unit, said picture quality unit having multiple duplicate data paths, each having a matrix multiplier for performing color space conversion of said YUV data, a look-up table for performing de-gamma, and FIFO memories for providing data to a frame memory on multiple data paths, each data path thereby providing display-ready RGB data;

a frame memory having formatting circuitry for formatting said display-ready RGB data into bit-plane format and having memory cells for storing said display-ready RGB data for delivery to said SLMs, said memory cells being in data communication with said picture quality unit such that said frame memory is capable of receiving multiple lines of said display-ready RGB data in parallel;

three SLMS, one for each said color, for generating images based on display-ready RGB data in said bit-plane format; and a timing unit, which is in data communication with each of the above elements of said system, that receives said YUV control signal or said RGB control signal and delivers timing signals in response to said control signal.

14. The system of claim 13, wherein said YUV-data processing unit has a vertical scaling processor for vertically scaling said input resolution.

15. The system of claim 14, wherein said second SVP of said YUV-data processing unit performs vertical scaling of said input resolution.

16. The system of claim 13, wherein said RGB-data processing unit has vertical scaling processors on each of said subpaths for vertically scaling said input resolution.

17. The system of claim 16, wherein said vertical scaling processors are SVPs.

18. The system of claim 13, wherein said horizontal scaling processors of said YUV-data processing unit are SVPs.

19. The system of claim 13, wherein said horizontal scaling processors of said RGB-processing unit are SVPs.

20. The system of claim 13, wherein said frame memory is an application specific integrated circuit with said memory cells and said formatting circuitry integrated in a single device, said device being duplicated in accordance with the resolution of said SLMs.

* * * * *

UNITED STATES PATENT AND TRADEMARK OFFICE
CERTIFICATE OF CORRECTION

PATENT NO. : 5,990,982
DATED : November 23, 1999
INVENTOR(S) : Robert Gove, et. al.

It is certified that error appears in the above-indentified patent and that said Letters Patent is hereby corrected as shown below:

Cover Page, insert Item [60] under Related U.S. Application Data

--Provisional Application No. 60/008,981 Dec, 21, 1995.--

Signed and Sealed this

Twentieth Day of March, 2001

*Attest:*

NICHOLAS P. GODICI

*Attesting Officer*  *Acting Director of the United States Patent and Trademark Office*